United States Patent Office 3,059,329
Patented Oct. 23, 1962

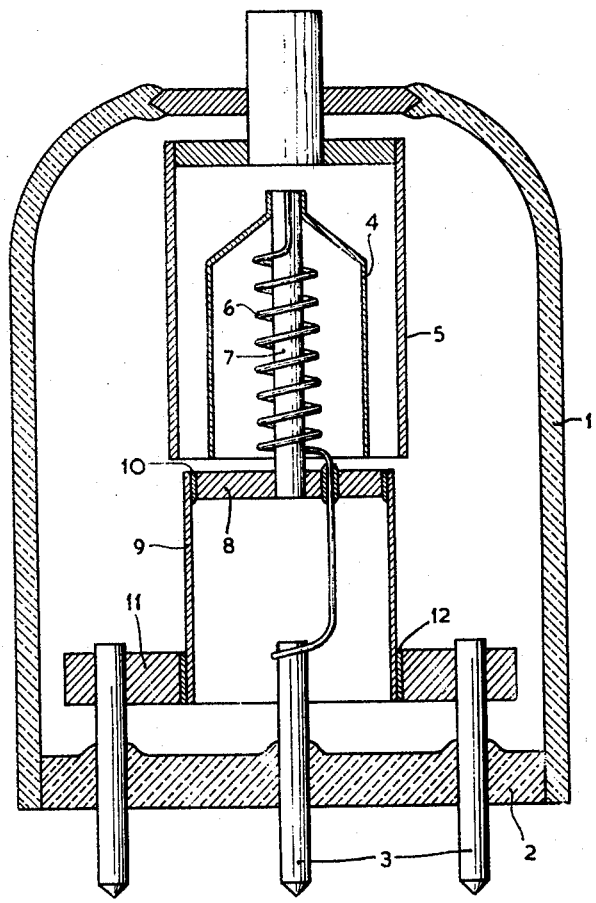

3,059,329
METHOD OF SOLDERING MOLYBDENUM FOIL BY MEANS OF MOLYBDENUM CARBIDE
Hans Georg Gerlach, Eindhoven, Netherlands, assignor to North American Philips Company Inc., New York, N.Y., a corporation of Delaware
Filed Oct. 15, 1958, Ser. No. 767,311
Claims priority, application Netherlands Oct. 23, 1957
2 Claims. (Cl. 29—501)

It is known that the carbides of refractory metals, or their solid solutions in an excess of metal, may serve as a soldering material for soldering such refractory metals. This is important for those cases in which the soldering area is subject to high temperatures. The term "refractory metals" is to be understood in this case to mean tungsten, tantalum, niobium, titanium, thorium, zirconium and more particularly molybdenum.

Thus, for example, objects of molybdenum may be connected together with the use of molybdenum carbide as a solder. However, it has been found that, if one of the parts is a foil, it dissolves in the liquid solder and is thus damaged.

This disadvantage may be obviated if the foil of refractory metal is soldered with the use of a mixture consisting of substantially equal amounts of weight of the metal of the foil and the carbide thereof. It has surprisingly been found that the foil now does not dissolve in the soldering material.

The invention is important more particularly for electric discharge tubes in which the cathode is secured to a foil of refractory metal for the purpose of decreasing the dissipation of heat. The invention has been found particularly advantageous when use is made of a molybdenum foil.

In order that the invention may be readily carried into effect, one embodiment will now be described in detail, by way of example, with reference to the accompanying drawing.

In the FIGURE, reference numeral 1 indicates the envelope of an electric discharge tube which is closed by means of a base 2. Contact pins 3 are sealed into the base 2. The tube contains an indirectly heated cathode 4 and an anode 5. The heater 6 is attached to a robust central rod 7, to which the cathode 4 is also secured.

The central rod 7 is secured in a molybdenum disc 8, which is soldered to a supporting cylinder 9, which consists of molybdenum foil, with the use of solder 10 according to the invention. The other extremity 12 of cylinder 9 is connected to a junction ring 11, which is supported by the contact pins 3. The solder 12 may consist, for example, of copper because the temperature at this area remains low.

The solder 10, which acquires a high temperature during the operation of the tube, must contain about equal amounts by weight of MoC and Mo. A tolerance of 10% in either direction is allowed so that the ratio may lie between 45% and 55% by weight of MoC.

What is claimed is:
1. In the method of attaching a molybdenum foil to a molybdenum object by soldering, the step of contacting said foil and said object with a soldering composition consisting of a mixture of 45% to 55% by weight of molybdenum and the remainder molybdenum carbide and liquifying said composition while in contact with said foil and said object.
2. The method of claim 1 wherein about equal parts by weight of molybdenum and molybdenum carbide are employed in the soldering composition.

References Cited in the file of this patent

UNITED STATES PATENTS

| | | |
|---|---|---|
| 1,924,528 | Waltenberg | Aug. 28, 1933 |
| 2,160,659 | Hensel | Oct. 5, 1937 |
| 2,220,961 | Kern | Nov. 12, 1940 |
| 2,431,975 | Yockey et al. | Dec. 2, 1947 |
| 2,652,621 | Nelson | Sept. 22, 1953 |
| 2,725,287 | Cronin | Nov. 29, 1955 |
| 2,775,809 | Steinitz | Jan. 1, 1957 |

FOREIGN PATENTS

| | | |
|---|---|---|
| 487,263 | Great Britain | June 17, 1938 |

OTHER REFERENCES

Drieschman et al., abstract of application Serial Number 25,054, published Feb. 5, 1952. 655 O.G. 274.